(12) United States Patent
Dye

(10) Patent No.: US 7,189,008 B2
(45) Date of Patent: Mar. 13, 2007

(54) INDEXED OPTICAL FIBER CONNECTOR

(75) Inventor: David E. Dye, Rancho Santa Margari, CA (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/314,610

(22) Filed: Dec. 20, 2005

(65) Prior Publication Data

US 2006/0171639 A1 Aug. 3, 2006

Related U.S. Application Data

(60) Provisional application No. 60/636,880, filed on Dec. 20, 2004.

(51) Int. Cl.
*G02B 6/36* (2006.01)
(52) U.S. Cl. .................... 385/78; 385/60; 385/72; 385/81
(58) Field of Classification Search ............ 385/78, 385/77, 81, 86, 60, 62, 72, 139
See application file for complete search history.

(56) References Cited

U.S. PATENT DOCUMENTS

| | | | |
|---|---|---|---|
| 3,761,869 A | 9/1973 | Hardesty et al. | |
| 3,954,320 A | 5/1976 | Hardesty | |
| 4,787,706 A | 11/1988 | Cannon, Jr. et al. | |
| 4,793,683 A | 12/1988 | Cannon, Jr. et al. | |
| 4,934,785 A | 6/1990 | Mathis et al. | |
| 5,481,634 A | 1/1996 | Anderson et al. | |
| 6,151,432 A * | 11/2000 | Nakajima et al. | 385/60 |
| 6,155,146 A * | 12/2000 | Andrews et al. | 81/461 |
| 6,287,018 B1 | 9/2001 | Andrews et al. | |
| 6,293,710 B1 | 9/2001 | Lampert et al. | |
| 7,104,702 B2 * | 9/2006 | Barnes et al. | 385/77 |
| 2004/0105625 A1 | 6/2004 | Ueda et al. | |
| 2005/0105876 A1 | 5/2005 | Finona et al. | |

* cited by examiner

*Primary Examiner*—Hemang Sanghavi
(74) *Attorney, Agent, or Firm*—Charles S. Cohen

(57) ABSTRACT

A high-performance connector for optical fibers includes a cylindrical ceramic or metallic ferrule installed in a structure. This structure is positioned in a non-plastic (metallic system) base member to form a fiber holder. This overall generally cylindrical structure includes a small passageway along its central axis for holding an optical fiber. This entire structure is mounted within the non-plastic housing that includes an opening at one end thereof from which the ceramic ferrule protrudes. A cylindrical spring that is integral to the ferrule support structure and interacts with an interior surface of the surrounding structure via a secondary piece of the cylindrical structure urges the ceramic ferrule outward from the opening in the housing. The housing includes a metallic leaf-spring latch which is located on a single surface thereof, which is manually operable and used to lock the connector to an associated receptacle. Said connector; because it is manufactured of non-plastics in its structural elements (metallics and/or ceramics) has very stable optical performance criteria over a broad range of environments (both thermal and mechanical). The high performance optical connector also introduces the ability to remove the cylindrical fiber holder to directly inspect or clean the sensitive internal components (springs, internal metallic or ceramic components). In addition, the cylindrical structure provides a mean of "tuning" it to remove the effects of fiber eccentricity. When tuned, the fiber holder retains such tuning even outside the housing allowing re-assembly of the high-performance connector without loss of "tuning".

11 Claims, 4 Drawing Sheets

INDEXED OPTICAL FIBER CONNECTOR

This application claims priority from a provisional application No. 60/636,880 filed on Dec. 20, 2004.

TECHNICAL FIELD

This invention relates to apparatus for making connections between optical devices, and more particularly to a connector for terminating an optical fiber.

BACKGROUND OF THE INVENTION

Optical fiber connectors are an essential part of substantially any optical fiber communication system. For instance, such connectors may be used to join segments of fiber into longer lengths; to connect fiber to active devices such as transceivers, detectors and repeaters; or to connect fiber to passive devices such as switches and attenuators. The central function of an optical fiber connector is the maintenance of two optical fiber ends such that the core of one of the fibers is axially aligned with the core of the other fiber; and consequently, all of the light from one fiber is coupled to the other fiber as efficiently as possible. This is a particularly challenging task because the light-carrying region (core) of an optical fiber is quite small. In single mode optical fibers the core diameter is about 9 microns where 1 micron=1× 10−3 mm. For multi-mode fiber the core can be as large as 62.5 to 100 microns, and hence alignment is less critical. However, precision alignment is still a necessary feature to effectively interconnect the optical fibers.

Another function of the optical fiber connector is to provide mechanical stability and protection to the junction in its working environment. Achieving low insertion loss in coupling two fibers is generally a function of the alignment of the fiber ends, the width of the gap between the ends, and the optical surface condition of either or both ends. Stability and junction protection is generally a function of connector design (e.g., minimization of the different thermal expansion and mechanical movement effects). An optical fiber connector typically includes a small cylinder of metal or ceramic with a glass or plastic fiber installed along its central axis. This cylinder is typically referred to as a ferrule. The support structure around the ferrule and the mechanism (typically a spring) pushing the ferrule into an opposing ferrule comprises the operating sections of an optical connector.

In a connection between a pair of optical fibers, a pair of ferrules is butted together—end to end—and light travels from one to the other along their common central axis. In this conventional optical connection, it is highly desirable for the cores of the glass fibers to be precisely aligned in order to minimize the loss of light (insertion loss) caused by the connection; but as one might expect, it is presently impossible to make perfect connections. Manufacturing tolerances may approach "zero," but practical considerations' such as cost, and the fact that slight misalignment is tolerable, suggest that perfection in such matters may be unnecessary. What is critical however is stability across the anticipated operating environment the fiber joint will be installed into.

Historically, due to manufacturing costs and design features, optical connectors have tended to be manufactured as an assembly of loose components, many of which are manufactured from plastic. For high performance connectors intended for single mode I application, the need to tune out the eccentricity of assemblies has been required and until the introduction of this invention, there has not been a method to utilize all metallic or ceramic structures to achieve tuning and performance in extremely harsh or severe, environments that exceed the operational characteristics of plastics. Tuning has been enabled in the past when the ferrule support structure engages the connector housing. This is an undesirable effect as the housing becomes an integral element in tuning and if the housing is removed or replaced, tuning is in effect lost.

One popular design of an optical fiber connector is shown in U.S. Pat. No. 4,793,683; and its basic components comprise a precision molded plastic conical plug having an optical fiber centered therein, a compression spring disposed about a cylindrical portion of the plug, and a retention collar surrounding the plug and spring. The collar includes external threads that enable it to couple with another connector via a fixture having a precision molded alignment sleeve whose shape is best described as "biconic." This design has been superseded by the connector shown in U.S. Pat. No. 4,934,785 which comprises a cylindrical plug, a base member that holds the plug, a compression spring, and a cap that surrounds the plug and spring. In this design, only the cylindrical plug needs to be of high precision and is typically made from a ceramic material. When joining two of these plugs together, an alignment sleeve is used, which comprises a split, thin-walled cylinder made of metal, ceramic or even plastic material. This alignment sleeve need not be as precise as the above-described biconic alignment sleeve.

And while the above connectors perform satisfactorily, further improvements were desirable. For example, because of the growing acceptance of optical fiber as the transmission media of choice for analog and digital data, the need to provide higher density interconnection arrangements emerged. All of the above-mentioned simplex optical connectors are constructed in such a way that the ability to stack a large number of them together is limited by the need to manually grasp both sides during insertion and removal from a receptacle or coupling device. Known duplex optical connectors, such as the one shown in U.S. Pat. No. 4,787,706, also require manual access to the opposite sides of its housing during removal from the receptacle or coupling device which precludes high density optical fiber interconnection arrays.

With these latter desires in mind, reference is made to the art of electrical connectors where, perhaps, the most used and accepted connectors are the ones known as RJ11-type plugs/jacks that are typically used in corded telephone products. These connectors have achieved widespread acceptance because they are inexpensive, they operate reliably, and customers readily understand their operation. However, because of the high precision and low insertion loss requirements associated with optical interconnections (particularly between small numerical aperture single mode fibers), RJ11-type designs have been 'unacceptable for optical connectors. Examples of such electrical connectors are disclosed in U.S. Pat. Nos. 3,761,869 and 3,954,320.

Recognizing the engineering challenge posed by the alignment of two very small optical fiber cores, it is still desirable to provide connectors, which are smaller, less expensive, and yet more convenient for customers to manipulate. Such connectors would be of great commercial importance. Such a design is disclosed in U.S. Pat. Nos. 5,481,634, 6,293,710 and 6,287,018 where-in a plastic material is used to manufacture a housing assembly. Said housing assembly closely resembled the RF11 type noted above. The latching system is integrated as a single cantilever assembly. Said connector identifies the use of the fiber-holding structure which comprises a cylindrical plug and a base member which holds an end portion of the plug. The base member is generally cylindrical, but it includes a flange around its circumference at one end thereof. A spiral compression spring surrounds the base member with one end of the spring pressing against the flange and the other end pressing against an interior surface of the housing. Preferably, the ferrule has a circular cross section and whose axial passageway (capillary) is substantially concentric with the outer cylinder surface. Additionally, the flange is adapted to enable the base member to fit into the housing in a number of different stable positions so that rotating the base member to orient the fiber eccentricity in a predetermined direction can minimize fiber eccentricity optical performance degradation. In the preferred embodiment of the invention, a square flange is used although in later patents the design feature has incorporated hexagonal eccentricity adjustment features. The description of the product in these patents by AT&T Corp. Anderson, et al is for what is commonly known as the LC connector.

The LC connector delivers all of the features desired by a majority of the optical connector applications with the exception of performance in extremely harsh environments, and an ability to directly inspect internal elements of the connector or replace external components of the connector without losing the tuning or eccentricity compensation. These are limited by the very nature of the connector itself, either a one piece outer housing or a complex assembly of plastic components that by nature are damaged when repairs are attempted. Such plastic components are also by nature unstable at elevated temperature where plastic elements begin to out gas and become brittle. Within the U.S. Pat. No. 5,481,634 mention is made of connector construction using metallic body materials. However, the design suggested requires a multi-sectioned housing rather than a one piece housing. With the commercial market's desire for a severe environment version of the LC connector that retains its tuning or eccentricity compensation, if such a connector with a single piece metallic or ceramic housing could be designed to be manufacturable at a reasonable cost, it would hold extremely high value in various applications, such as aerospace, chemical or pharmacology applications.

SUMMARY OF THE INVENTION

The invention that is disclosed herein is an optical fiber connector intended for use in severe environments. Said optical connector is configured to include all of the features indicated below to allow operation in severe environments, including thermal and mechanical stresses, while retaining features that deliver superior optical performance as determined by optical insertion loss and return loss performance. The invention is a principally rectangular body with a leaf spring latch attached to one of its faces. The leaf spring latch is intended to move in an arc relative to the longitudinal axis of the housing. If the proper design architecture is utilized, the severe environment connector housing can be manufactured entirely from metallic or ceramic materials. Other materials can be used which will not deteriorate under thermal and mechanical stresses. Further, if properly integrated with a well designed optical fiber holding structure the eccentricity effects can be removed from the connector by indexing the fiber holding structure relative to the rectangular body. If properly designed a metallic leaf latch system can be used to retain the connector assembly in a mated condition. When consideration of this is taken a connector that operates and is repairable in extremely harsh environments can be envisioned.

There are a number of known optical fiber connectors. Some of the common trade names are FC, SC, ST and the product that most closely resembles the connector being disclosed LC. Insertion and removal of these types of connectors generally requires that the user be able to fit his/her fingers onto one or more of the sides of the connector. Connector removal is typically accomplished by sliding a latch (SC), depressing a latch (LC) or rotating a latch (ST, FC). In the case of rotation, FC connectors are multi-turn connectors where-as ST's are an improvement requiring only a partial turn to decouple a "bayonet" style coupling system. Only the turn to decouple connectors have metallic components and no known connector is manufactured entirely of non-plastic (ceramic or metallic) components. Further, none of the available connector systems identified can be entirely disassembled and retain the fiber eccentricity compensation if they have such.

Accordingly, the present invention provides packaging density exceeding all of the connectors identified and provides packaging density equal to that of the LC. The latching system is similar to that provided by the LC with the exception of the method of execution of the latching system and the materials of manufacture. In the existing LC connector the latch is integral with the plastic body and is cantilevered. The subject invention disclosed herein uses a separable "leaf" spring style latching system manufactured from temperature stable metallic materials. Through the unique design features of the connector to be disclosed all plastic materials, which may deteriorate under thermal ands mechanical stress, can be removed from the connector body, ferrule, and support structures if desired.

Fiber eccentricity compensation is currently only available on the LC style connector. Said compensation is attained using a square or hex registration on the ferrule support structure. Said support structure engages an appropriate pattern within the LC connector body and retains positioning by engaging said body. Thus tuning or fiber eccentricity compensation is only retained as the ferrule and its support is retained within the connector body. Once removed it is not possible to determine the exact positional relationship between the fiber holding structure and the connector body. The invention disclosed incorporates an optical ferrule holding structure and support structure that has a "key" feature that identifies positional location for proper tuning. The invention disclosed shows that if this "key" feature is properly positioned and retained within the connector body the entire assembly can retain its eccentricity compensation when the fiber support structure is removed from the connector body.

Since retaining eccentricity compensation is the main feature of the disclosed invention, it is critical to understand the eccentricity issues. Alignment variations between a pair of interconnected ferrules are principally attributable to the parameter known as "eccentricity" of the optical fiber core with respect to the ferrule. Eccentricity is defined as the distance between the longitudinal centroidal axis of the ferrule at an end face of the ferrule and the centroidal axis of the optical fiber core held within the passageway of the ferrule. Generally, the passageway is not concentric with the outer cylindrical surface that is the reference surface. Also, the optical fiber may not be centered within the ferrule passageway and the fiber core may not be concentric with the outer surface of the fiber. Hence, the eccentricity is comprised of the eccentricity of the optical fiber within the ferrule passageway and the eccentricity of the passageway within the ferrule.

If one could view the end portion of a "lit" optical fiber what would be seen is a circle with a dot of light somewhat displaced from the exact center of the circle. Eccentricity can be understood as a two-dimensional vector having magnitude and direction components. The "magnitude component" of the eccentricity vector is the straight line distance between the center of the circle and the dot of light, while the "direction component" of the eccentricity vector is the angle made by that straight line with respect to the X-axis of a 2-dimensional Cartesian coordinate system whose origin is at the center of the circle. It is noted that ferrules used in conventional optical connectors (i.e., ST, SC and FC) have a 2.5 mm diameter while the ferrule used in a preferred embodiment of the present invention has a diameter which is half that size as utilized by the LC connection system. With the use the reduced-size ferrule, the magnitude component of the eccentricity vector is proportionally reduced— which improves precision.

Rotating one of two interconnected ferrules typically changes the relative position of the fibers held within the passageway because of the eccentricity of the optical fiber core with respect to the ferrule. Because it is very difficult to control the eccentricity of the optical fiber core in the ferrule in which it is terminated, it is difficult to achieve desired losses of 0.1 dB or less in single mode fibers without maintaining close tolerances so that the opposed cores are aligned to within about 0.7 microns. This, of course, increases the manufacturing cost. If the total eccentricities of the two optical fiber ends to be joined are identical, or at least very nearly so, then a low-loss connection can be achieved by merely rotating, within the alignment sleeve, one ferrule with respect to the other, until maximum coupling is observed (minimum insertion loss).

BRIEF DESCRIPTION OF THE DRAWINGS

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

DESCRIPTION OF THE PREFERRED EMBODIMENT

Figure 1:
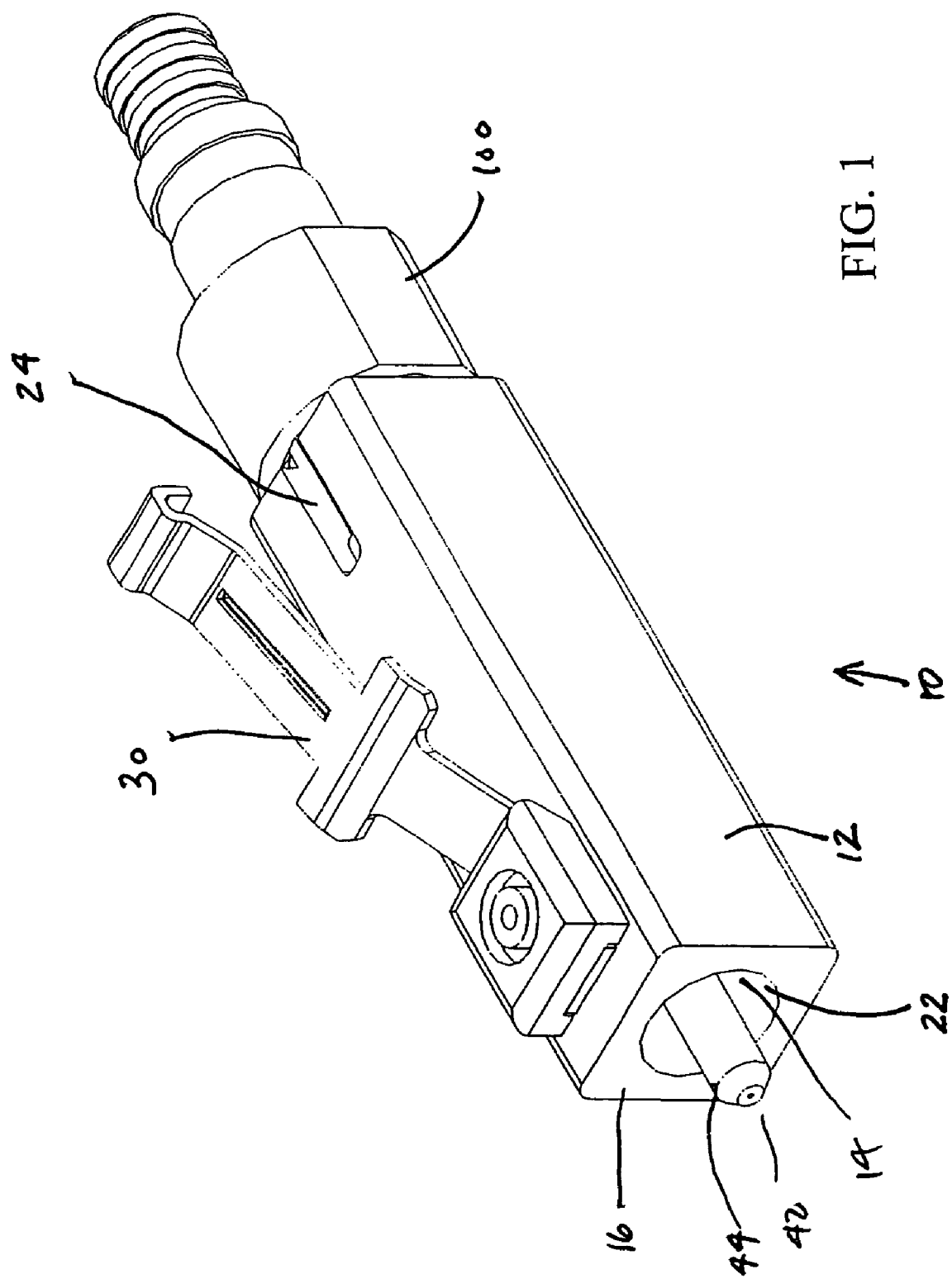
FIG. 1 shows the fiber connector without a fiber cable.

The organization and manner of the structure and operation of the invention, together with further objects and advantages thereof, may best be understood by reference to the following description taken in connection with the accompanying drawings wherein like reference numerals identify like elements in which:

The present invention enables fiber eccentricity to be compensated through the use of an indexing feature or portion 90 in the fiber holder structure 50. The fiber holder is designed such that the ferrule 44 can be configured with one of six (hex) rotational positions relative to the indexing portion 90 although more or fewer rotational positions may be used. Such a design enables the ferrule 44 and the fiber holder 50 to be installed in connector body with an index in one of six rotational positions (0 degrees, 60 degrees, 120 degrees, 180 degrees, 240 degrees, and 300 degrees). The particular position selected is determined during fabrication of the connector by measuring fiber eccentricity, rotating the base member 80 of the fiber holder 50 by an amount based on an optical power loss minimization measurement. The final requirement for a high optical performance connector is to radially align the ferrule in relation to the key 56 through the indexing portion so that this relation is maintained when the fiber holder 50 is installed into the connector housing 12. For example, eccentricity is always aligned with the spring latch 30 shown in FIG. 2. It can be seen how the key 56 engages the housing within a linear slot 24 along one of its walls. With the key properly positioned, the radial alignment and high optical performance is maintained.

Figure 2:
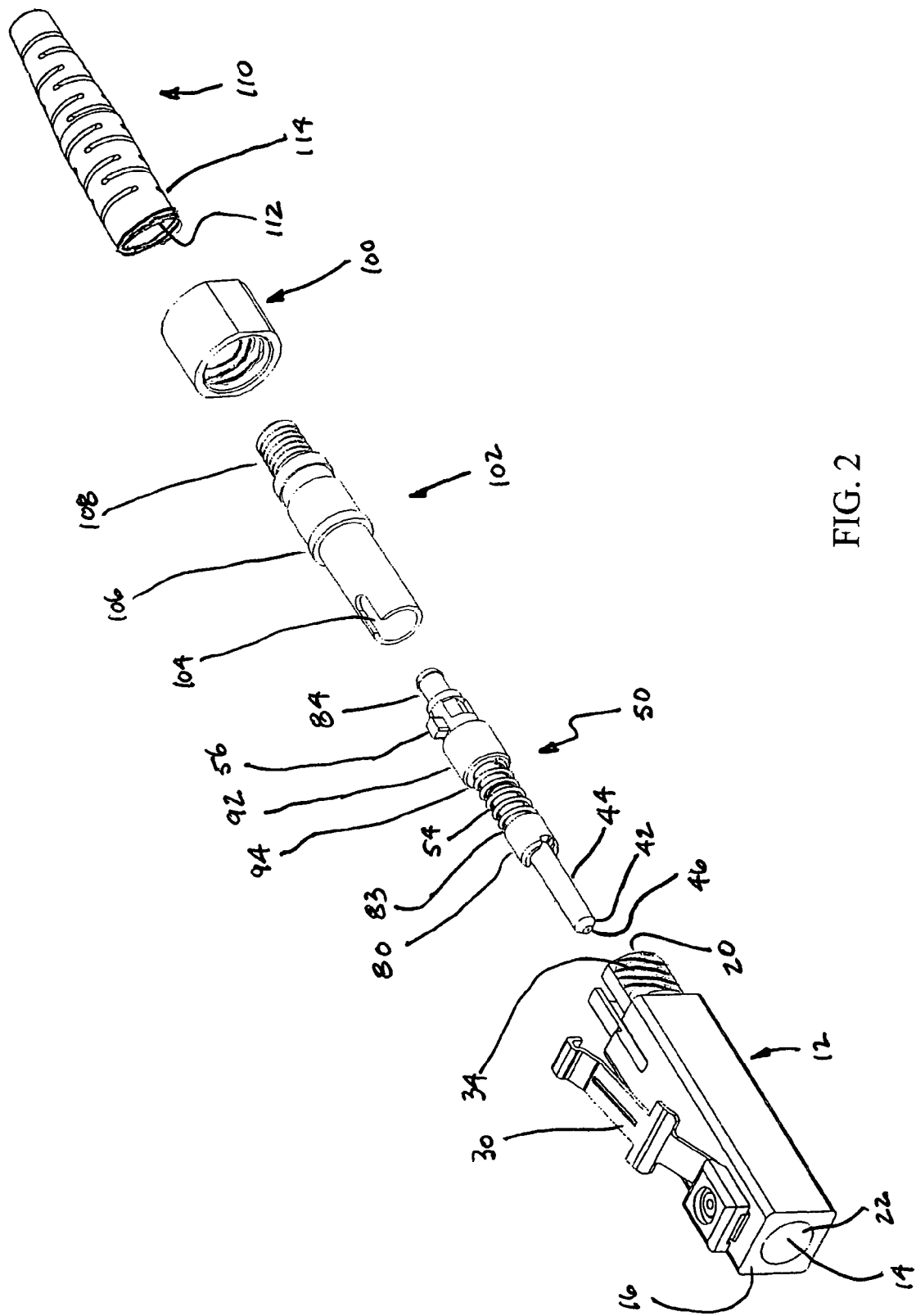
FIG. 2 shows the fiber connector assembly without an optic fiber cable prior to final assembly.

FIG. 1 shows the assembly of the fiber connector 10 without the fiber cable shown. FIG. 2 shows the basic components of the connector which an operator will see in the field but without a cable installed. To assemble the connector the previously tuned spring loaded fiber holder 50 with the cable attached is inserted in the housing 12 with the key 56 sliding into slot 24. The locating cylinder 102 is slid over the rear member 84 and the sliding collar 92 with the keyway 104 engaging key 56. To hold this assembly together a threaded collar 100 is placed over the locating cylinder 102 so that the threaded collar engages flange 106 and the threaded collar 100 is screwed onto the threaded end 34 of the housing 12.

Figure 3:
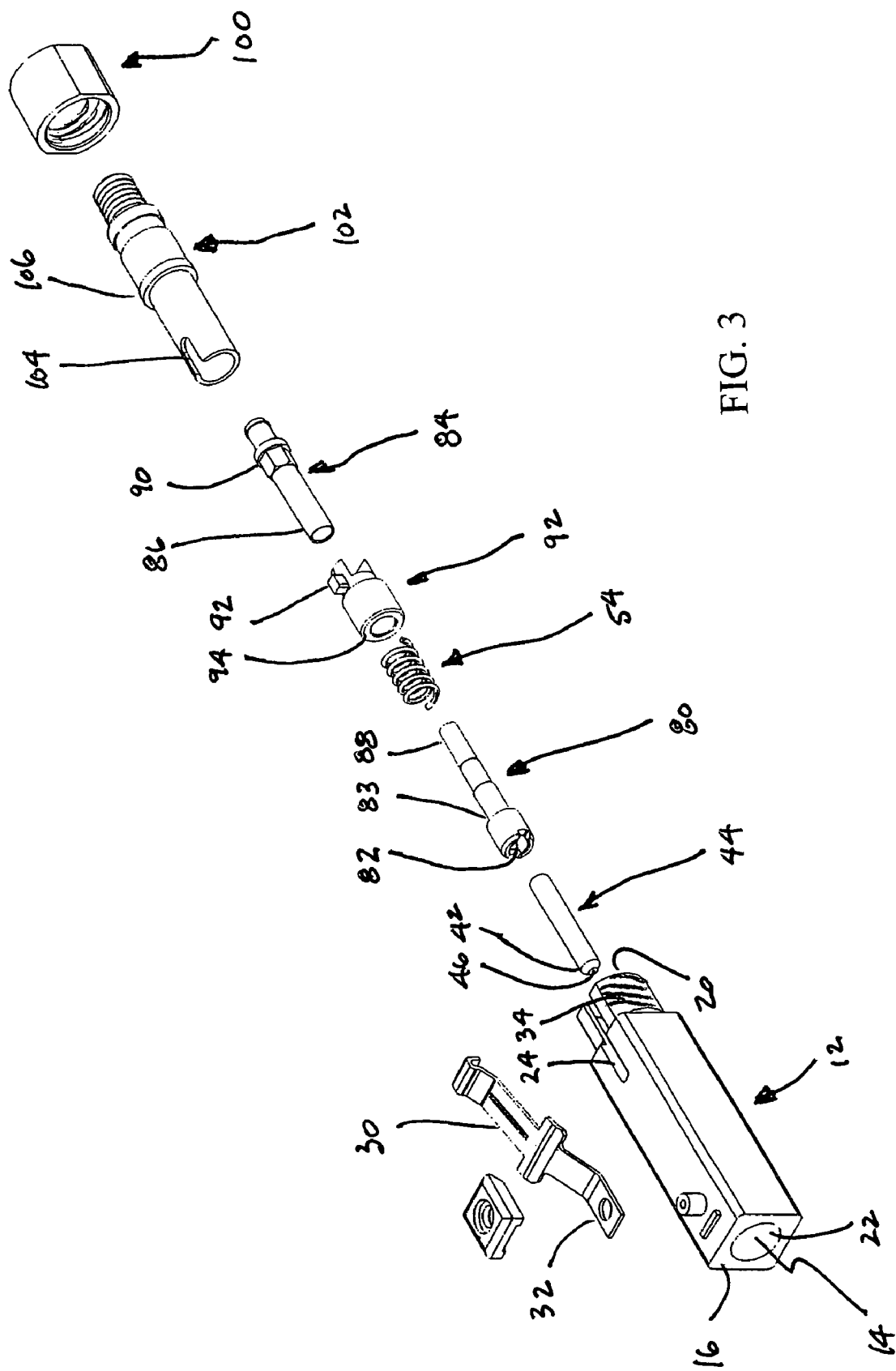
FIG. 3 shows an exploded view of all of the components of the optic fiber connector.
Figure 4A:
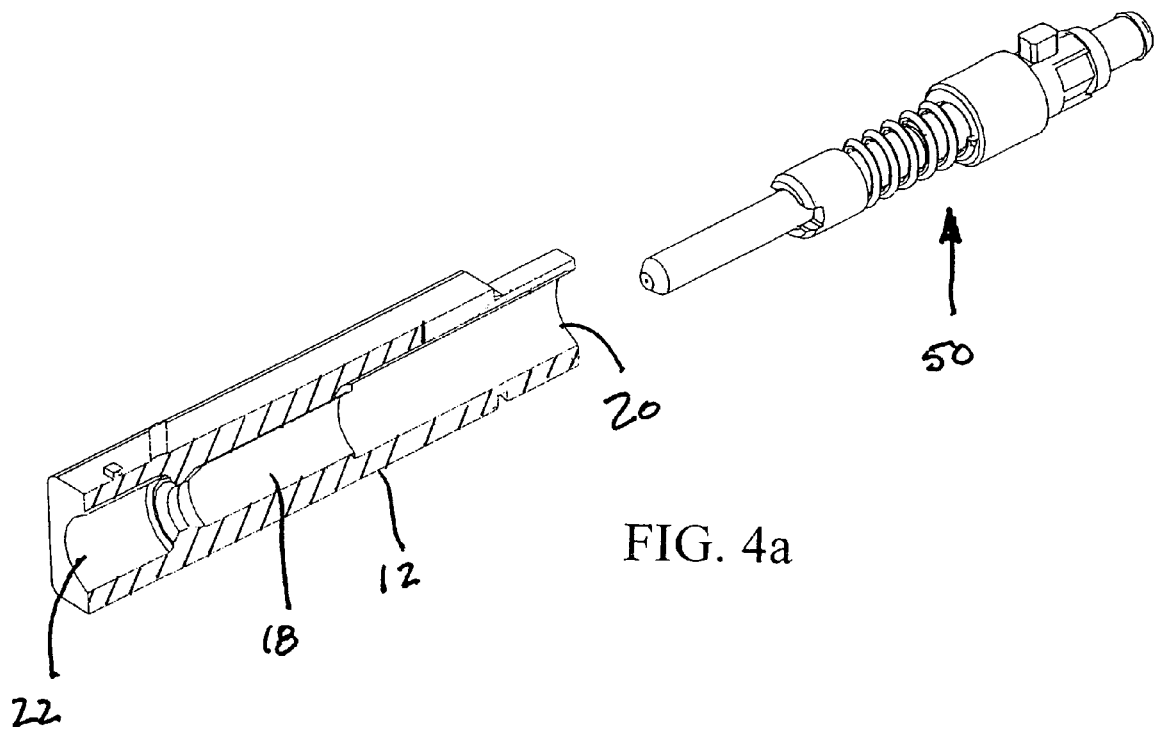
FIG. 4a shows a cross sectional view of the fiber holder and the housing prior to insertion.
Figure 4B:
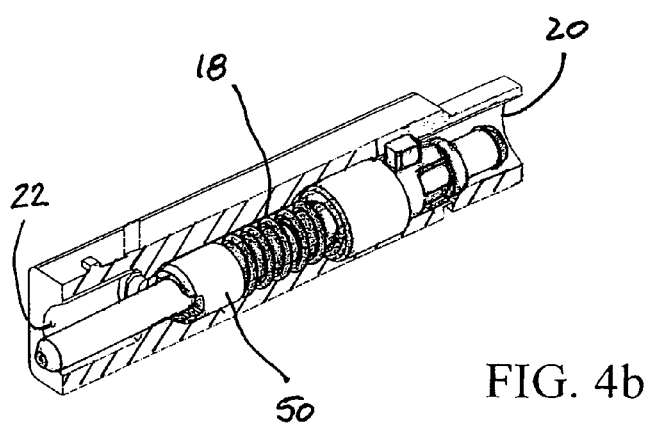
FIG. 4b shows a cross sectional view of the fiber holder inserted within the housing.

FIGS. 3 discloses more details of the eccentricity compensation spring loaded indexing fiber-holder 50. The connector includes a housing 12 with an axial passageway 14 which terminates in the end face 16 of the housing 12. This passageway is adapted to receive a fiber filament end of a fiber cable (not shown) in an end 42 of a ferrule 44. The housing 12 has internal surfaces that define a cavity 18 to surround and accept the fiber holder 50. FIG. 4a shows the housing cavity and fiber holder separate from each other. FIG. 4b shows the housing cavity 18 surrounding the fiber holder 50. The housing has a first opening 20 for receiving the fiber holder 50 to which the optical cable (not shown) is fixed. The housing has a second opening 22 for enabling the end 42 of the ferrule 44 to protrude there through. The openings extend into the cavity 18 and are positioned at opposite ends of the housing. A manually operated spring latch 30 is positioned on a single side surface of the housing for securing the housing to an associated receptacle (not shown) to preclude unintended decoupling there between. The latch 30 is movable in a direction which is described by a continuous arc relative to the long axis of the fiber-holder 50 and comprises a leaf spring. The latch is fixed either permanently or semi-permanently to the housing having its fixed end 32 positioned toward the second opening 22 of the housing, The connector fiber holder 50 receives an optical cable (not shown). The optical cable consists of a glass fiber enclosed within a plastic buffer material. The optical cable further comprises a plurality of filamentary strength members surrounding the buffered fiber and a plastic jacket surrounding the filamentary strength members. The optical filament or fiber in the optical cable extends within an axial fiber passageway 46 and is terminated in said end 42. The fiber passageway receives the filament which is an uncoated end portion of the associated fiber cable. A base member 80 holds the ferrule 44. The base member includes an axial optical cable passageway 82 which is collinear with the fiber axial passageway 46 of the ferrule 44. The cylindrical ferrule has a diameter of about 1.25 millimeters. A shoulder 83 on the base member 82 engages spring 54. A rear member 84 has a mating section 86 which is joined to a rear section 88 of the base member 80 forming a shaft. The rear member includes a multi-positional eccentricity indexing portion 90, such as a hexagonal section.

A collar 92 is also provided which has a shoulder 94 to engage spring 54. The spring 54 and collar 92 are slidingly positioned over the shaft formed by the mating section 86 and the rear section 88. The spring member 54 is disposed between shoulders 83, 94 pushing the base member 80 away from the collar 92. This will urge the fiber holder toward the second opening 22 so that the end 42 of the ferrule 44 extends through the second opening 22 in the housing. The collar 93 also has a key 56 which engages slot 24 in the housing 12. This allows the entire fiber-holder 50 to be removed from the connector housing while retaining its singular stable angular position when returned to the connector housing.

The housing 12, which receives the fiber holder 50, has an interconnecting or locking member. This interconnecting or locking member consists of a threaded collar 100 and a locating cylinder 102. The locating cylinder 102 has a key way 104 which engages the key 56 forcing the fiber holder 50 toward the second opening 22 of the housing 12. The threaded collar 100 engages a flange 106 on the locating cylinder 102 around the first opening 20 in the housing and is fixed to the housing 12 by being screwed onto the threaded end 34. The locating cylinder 102 slides over a portion of the fiber holder 50 and slides within the cavity 18 of the housing 12. The interconnecting member can also include a single metal clip which engages the key 56 in a similar fashion as the locating cylinder with portions of the clip fixed to projections on the housing.

The housing and the interconnecting member are made a material which will not deteriorate under extreme thermal or mechanical stress. This material can include metal or ceramics. The metallic material can be an aluminum alloy for lowest possible weight or corrosion resistant steel or copper alloy for optimal environmental resistance. Since the housing and interconnecting member substantially enclose the fiber holder 50 when they are joined together and since they are made of materials which can withstand extreme thermal and mechanical stresses, the optical cable held in the fiber holder 50 is protected.

A strain-relief boot 110 has a longitudinal passageway 112 which holds the optical cable. A front portion 114 of the strain-relief boot surrounds the back end 108 of the locating cylinder 102 and captures the filamentary strength members of the optical cable so that tensile forces applied to the optical cable are transferred to the connector. The strain relief boot is adapted to limit the minimum bending radius of the optical cable in the region where it joins the connector.

The cylindrical fiber holder 50 provides means for "tuning" the fiber filament in the ferrule 44 prior to the fiber holder being inserted into the housing. This tuning is accomplished within the fiber holder where the indexing feature is contained within the fiber holder and the outer surface of the fiber holder 50 can be cylindrical rather than hexagonal. This fiber holder with a self contained indexing feature having a cylindrical outer surface will allow the housing to have a cylindrical rather than hexagonal cavity. A cylindrical rather than hexagonal cavity can be more easily manufactured from metal or ceramic materials. Since the housing is made of metal or ceramic materials, it can better withstand thermal or mechanical stresses. Once tuned, the fiber holder retains such tuning even after being removed from the housing allowing re-assembly which may be required for replacement, inspection, or cleaning without loss of tuning. Since the fiber holder is made from materials that can withstand extreme thermal and mechanical stresses without losing the eccentric tuning location, the connector has a very stable optical performance over a broad range of thermal and mechanical environments.

While a preferred embodiment of the invention is shown and described, it is envisioned that those skilled in the art may devise various modifications without departing from the spirit and scope of the foregoing description and the appended claims.

What is claimed is:

1. An optical fiber connector comprising:
   a housing having a body with at least one longitudinally cylindrical cavity extending between opposing first and second ends, the first end having a first opening communicating and in alignment with said cavity and the second end having a second opening communicating and in alignment with said cavity, said housing further having a slot in the housing body extending from the second end of the housing towards the first end;
   a fiber holder insertable within said cavity with a cylindrical outer surface, the fiber holder including a ferrule which holds a fiber filament therein, a locating collar having a key received in said housing slot, the locating collar including an indexing end, a rear member receivable in the indexing end, the rear member including an indexing portion with a plurality of indexing elements complimentary to said indexing end, and a biasing member disposed between said ferrule and said locating collar biasing said indexing end of said locating collar toward said indexing portion of the rear member and;
   means for locking said fiber holder in engagement with the housing body so that said ferrule is forced out of the first opening of said housing.

2. The optical fiber connector of claim 1 wherein said housing further includes a flexible latch fixed to an outer surface of the housing for engaging a latch shoulder on a mating connector to hold the optical fiber connector to a mating connector.

3. The optical fiber connector of claim 1 wherein said fiber holder locking means includes a threaded collar which engages the rear member and screws onto a threaded end of the housing.

4. The optical fiber connector of claim 3 wherein said means for locking the fiber holder further includes a locating cylinder which slides over the rear member and the collar, the locating cylinder having a keyway which engages the key on the locating collar and having a flange which is engaged by the threaded collar when said collar is screwed onto the threaded end of the housing.

5. The optical fiber connector of claim 1 wherein said housing material is metal.

6. The optical fiber connector of claim 1 wherein said housing material is ceramic.

7. An optical fiber connector comprising:
   a housing having a body with at least one longitudinally cylindrical cavity extending between opposing first and second ends, the first end having a first opening communicating and in alignment with said cavity and the second end having a second opening communicating and in alignment with said cavity, said housing further having a slot in the housing body wall extending from the second end of the housing toward the first end;

a fiber holder insertable within said cavity with a cylindrical outer surface, the fiber holder including a ferrule having a fiber passageway which holds a fiber filament from a fiber optic cable, a base member extending over the fiber optic cable and located adjacent the ferrule, a rear member extending over the fiber cable with an indexing portion, the base and rear members joined together forming a shaft, a locating collar and a biasing member sliding over said shaft, the biasing member disposed between a shoulder of the base member and a shoulder of the collar, the locating collar having an indexing end engageable with said indexing portion of the rear member, the locating collar also having a key which engages the slot in the housing, and;

means for locking said fiber holder in engagement with the housing so that the ferrule with said fiber filament is forced out of the front opening of the housing.

8. An optical fiber connector comprising:

a housing having a body with at least one longitudinally cylindrical cavity extending between opposing first and second ends, the first end having a first opening communicating and in alignment with said cavity and the second end having a second opening communicating and in alignment with said cavity, said housing further having a slot in the housing body extending from the second end of the housing towards the first end;

a fiber holder insertable within said cavity with a cylindrical outer surface, the fiber holder including a ferrule which holds a fiber filament therein and a key fixed to the ferrule received in said housing slot, and;

means for locking said fiber holder in engagement with the housing body so that said ferrule is forced out of the first opening of said housing, said locking means including a locating cylinder which slides over a locating collar, the locating cylinder having a keyway which is aligned with and slides about the key, and means for fixing the locating cylinder to the housing.

9. The optical fiber connector of claim 8 wherein the keyway in the locating cylinder engages the key.

10. The optical fiber connector of claim 8 wherein said fixing means includes a threaded collar which engages the locating cylinder and screws onto a threaded end of the housing.

11. The optical fiber connector of claim 8 wherein said key is on the locating collar fixed to the ferrule.

* * * * *